(12) United States Patent
Flint et al.

(10) Patent No.: US 8,797,688 B2
(45) Date of Patent: Aug. 5, 2014

(54) FILL-IN CONTACT LAYER FOR SLIDER AIR BEARING SURFACE PROTECTIVE COATING

(71) Applicant: HGST Netherlands B.V., Amsterdam (NL)

(72) Inventors: Eric W. Flint, San Jose, CA (US); Cherngye Hwang, San Jose, CA (US); Randall G. Simmons, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/691,551

(22) Filed: Nov. 30, 2012

(65) Prior Publication Data

US 2014/0153136 A1  Jun. 5, 2014

(51) Int. Cl.
 *G11B 5/127* (2006.01)
(52) U.S. Cl.
 USPC ........................................................ 360/235.1
(58) Field of Classification Search
 USPC ........................................................ 360/235.1
 See application file for complete search history.

(56) References Cited

U.S. PATENT DOCUMENTS

| | | | |
|---|---|---|---|
| 6,956,718 B1 * | 10/2005 | Kulkarni et al. | 360/235.1 |
| 8,164,862 B2 | 4/2012 | Zhang et al. | |
| 8,199,436 B2 * | 6/2012 | Yamada et al. | 360/235.1 |
| 8,202,572 B2 | 6/2012 | Zhao et al. | |
| 2009/0195932 A1 * | 8/2009 | Zhang | 360/235.4 |
| 2009/0219653 A1 * | 9/2009 | Aoki et al. | 360/294.4 |
| 2009/0325319 A1 | 12/2009 | Horng et al. | |
| 2010/0302683 A1 * | 12/2010 | Yamada et al. | 360/235.1 |
| 2010/0302685 A1 * | 12/2010 | Yamada et al. | 360/245.3 |
| 2011/0279921 A1 | 11/2011 | Zhang et al. | |
| 2012/0063034 A1 | 3/2012 | Hsu et al. | |

* cited by examiner

*Primary Examiner* — Allen T Cao
(74) *Attorney, Agent, or Firm* — Zilka-Kotab, PC

(57) ABSTRACT

A magnetic slider for magnetic data recording constructed by a process that allows for careful control of seed layer and overcoat thickness. The slider is treated by a process that result in surface pits and scratches. A refill layer is used to fill in the pits and scratches, the refill layer being constructed of a material that does not include Si or carbon. An angled ion beam etching can be used to remove portions of the refill layer that extend outside of the pits and scratches. Then, a seed layer comprising Si and a protective layer comprising C are deposited over the surface. Because the refill layer does not contain either of Si or C, the thickness of the seed layer and carbon overcoat can be acurately measured and controlled, without the refill layer being mistaken for seed or overcoat material.

22 Claims, 6 Drawing Sheets

FILL-IN CONTACT LAYER FOR SLIDER AIR BEARING SURFACE PROTECTIVE COATING

FIELD OF THE INVENTION

The present invention relates to magnetic data recording and more particularly to a novel refill process for an air bearing surface of a magnetic head.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

A magnetoresistive sensor such as a Giant Magnetoresistive (GMR) sensor or a Tunnel Junction Magnetoresistive (TMR) sensor can be employed to read a magnetic signal from the magnetic media. The write head includes at least one coil, a write pole and one or more return poles. When a current flows through the coil, a resulting magnetic field causes a magnetic flux to flow through the write pole, which results in a magnetic write field emitting from the tip of the write pole. This magnetic field is sufficiently strong that it locally magnetizes a portion of the adjacent magnetic disk, thereby recording a bit of data. The write field, then, travels through a magnetically soft under-layer of the magnetic medium to return to the return pole of the write head.

The magnetic read and write heads are formed on a slider body that can be constructed of a material such as Al—Ti—C. Various processing procedures, such as polishing of the slider and ion milling used to recess the magnetic read and write heads slightly from the air bearing surface, result in surface roughness on the air bearing surface portion of the magnetic read and write heads.

SUMMARY OF THE INVENTION

The present invention provides a slider for magnetic data recording that includes a slider body having a surface with a roughness that includes troughs and peaks, and a refill material filling at least some of the troughs, the refill material being a material that does not include silicon or carbon. A seed layer comprising Si is formed over the slider body surface and refill material, and a protective overcoat comprising carbon is formed over the seed layer.

The seed layer can also be referred to as an adhesion layer. This layer promotes adhesion of the carbon layer. By using a refill material that does not contain either of Si or C, the thickness of the seed layer and protective overcoat can be much more easily controlled. During deposition, the thickness of the seed layer and protective overcoat can be measured and controlled using an ellipsometer. After deposition, the thickness of the seed layer and protective overcoat can be measured by a process such as XRF or Auger measurement to confirm that thickness of these layers. Because the refill layer does not contain either of Si or C, the material of the refill layer will not interfere with the measurement of the thickness of the seed layer or protective overcoat during deposition of these layers or after deposition.

In addition, the refill layer can be constructed of a material having a high affinity for oxygen, such as AlOx, TaOx, CrOx, TaN, CrN which will help to protect the barrier layer of the read sensor, advantageously resulting in improved sensor performance.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
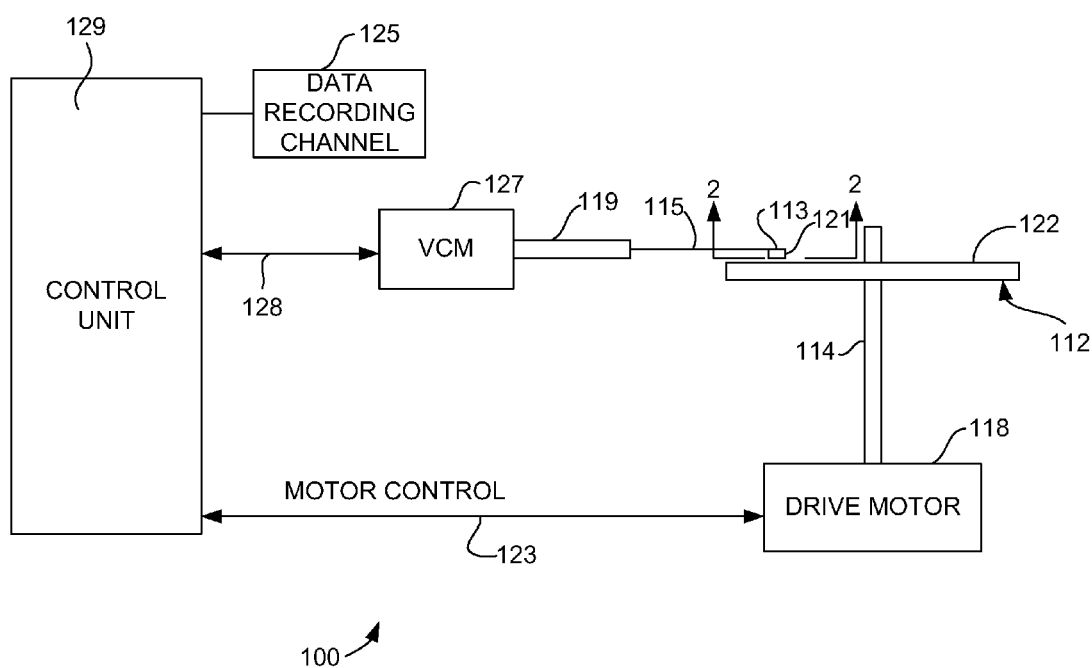
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radically in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
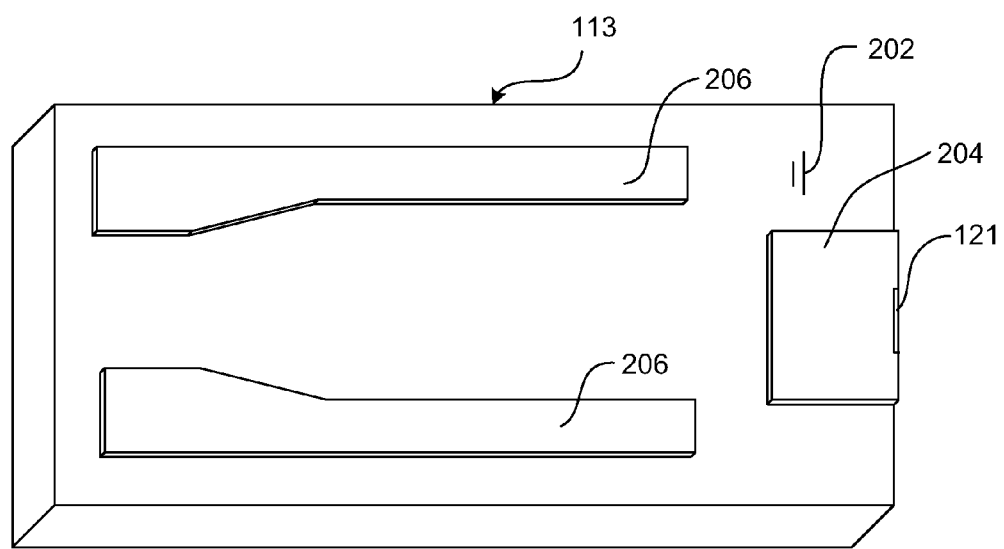
FIG. 2 is a perspective view of an air bearing surface of a slider.

With reference to FIG. 2, slider 113 has an air bearing surface 202 that is configured to optimize the flight characteristics when the slider 113 flies over the surface of the magnetic disk 112. To this end, the air bearing surface 202 can be formed with a topography that can include one or more pads 204 and/or rails 206. The configuration of this topography can vary with design requirements. The magnetic head 121, which includes a magnetic sensor and a magnetic write element, is formed at a trailing edge of the slider 113.

The topography of the air bearing surface 202 can be formed by one or more masking and etching processes. For example, starting with a flat air bearing surface, one or more etching masks can be formed over the air bearing surface 202 so as to cover areas where raised portions are desired. Then, an etching process such as a dry or wet etching can be performed to remove portions of the air bearing surface 202 that are not protected by the etch mask.

In addition a polishing process and possibly an etching process can also be performed to provide a desired amount of recessing of the read and write heads. This recession of the magnetic head compensates for thermal expansion of the magnetic head during operation. Current flow through the magnetic write head during operation generates heat, which results in thermal expansion of and protrusion of the magnetic head during operation. Recessing of the read and write heads assures that a desired fly height is maintained during operation without any contact between the magnetic head and the media.

Figure 3:
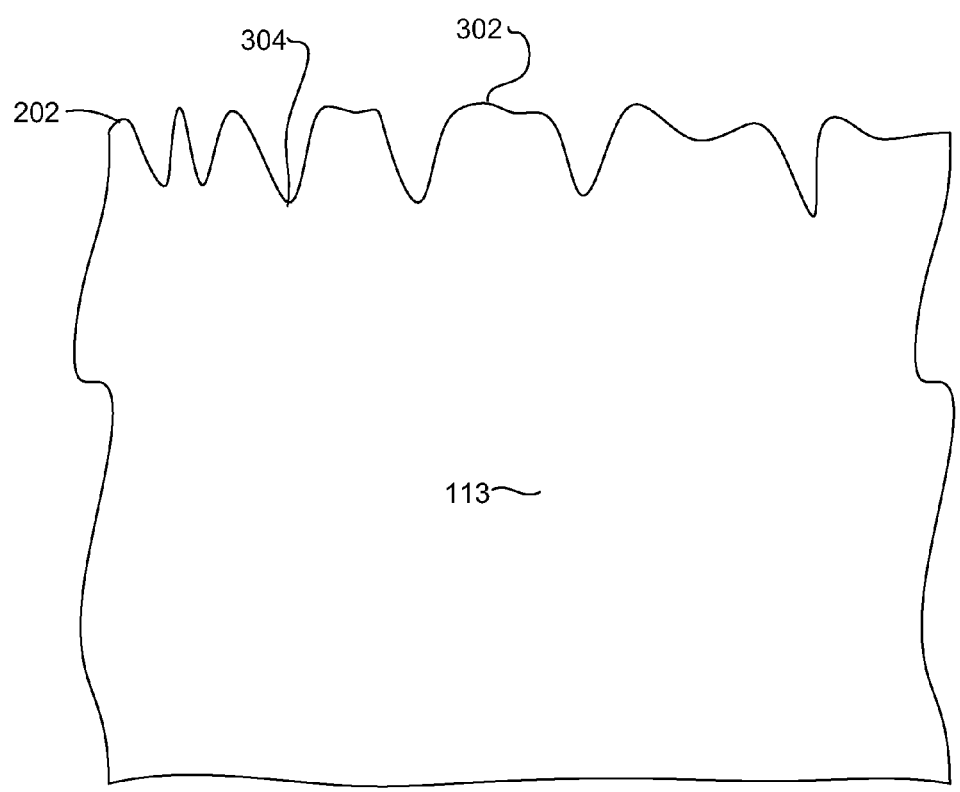
FIGS. 3-6 are enlarged sectional views of a portion of the slider shown in various intermediate stages of manufacture in order to illustrate treatment of the air bearing surface of the slider.

FIG. 3 shows a greatly enlarged cross sectional view of a portion of the slider 113 and the air bearing surface 202 in the region of the magnetic head 121. In FIG. 3 it can be seen that the air bearing surface has various troughs 302 and raised portions 304. It is desirable that the air bearing surface 202 be as smooth as possible in this region. In addition, in order to protect the magnetic head 121 (FIG. 2) as well as the disk from corrosion and from contact between the slider 113 and disk 112 it is desirable to deposit one or more protective layers and lubricant layers onto the air bearing surface 202. In order for these layers to be effective it is further desirable that the air bearing surface 202 be as smooth as possible.

Figure 4:
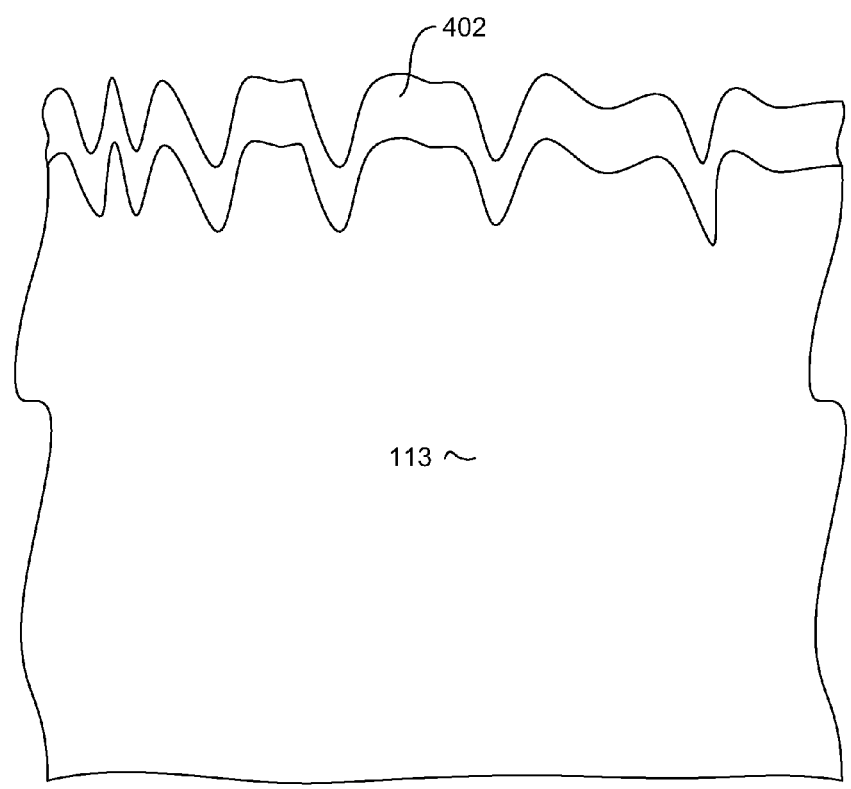

The present invention provides a process for optimizing the smoothness of the air bearing surface 202 in the area of the magnetic head 121 prior to depositing a protective layer or lubricant layer. With reference to FIG. 4, a refill material 402 is deposited over the air bearing surface. This refill layer is a 402 is a material that does not contain either Si or C, which is advantageous for reasons that will become clearer below. To this end, the refill layer 402 can be constructed of a material such as AlOx, TaOx, CrOx, TaN, CrN, etc. The refill layer 402 can be deposited by sputter deposition, such as ion beam deposition (IBD) or physical vapor deposition (PVD).

Figure 5:
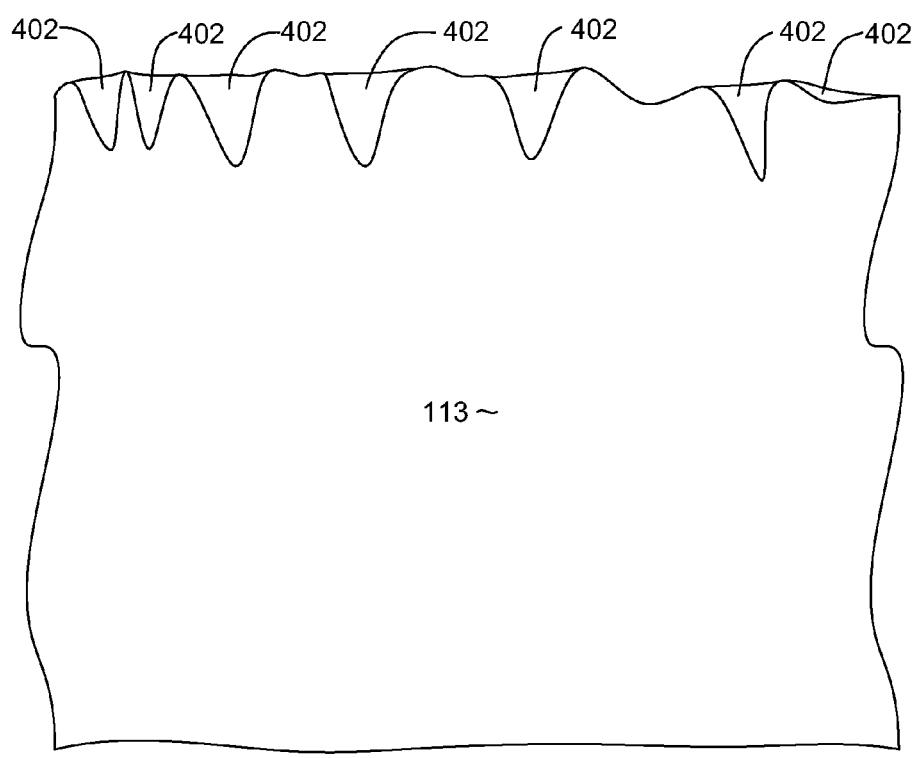

With reference now to FIG. 5, an angled ion beam etching process is performed to preferentially remove portions of the refill layer that extend out of the trenches, leaving a structure where the trenches are filled with refill material, but the peaks are generally exposed. This greatly smoothens the air bearing surface of the slider 113. The ion beam etch is preferably a two step glancing angled ion beam etching, wherein a first etching is performed at an angle of 70-80 degrees (or about 75 degrees) relative to normal. This is followed by a second ion beam etching that is performed at an angle of 55-65 degrees (or about 60 degrees) relative to normal.

Figure 6:
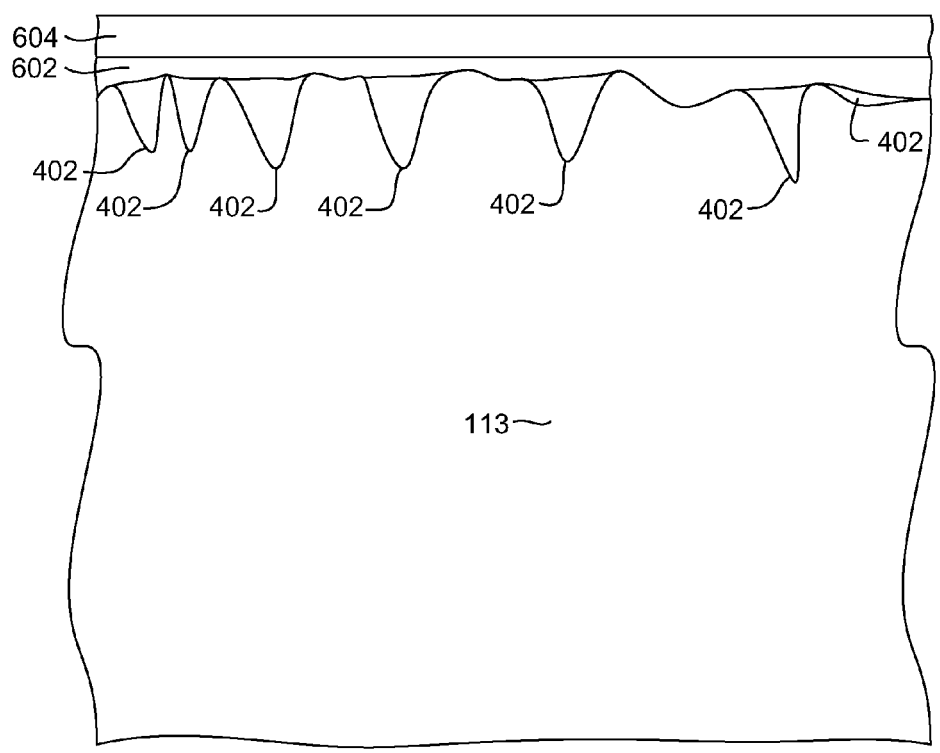

Then, with reference to FIG. 6, a seed layer 602 is deposited, followed by a protective overcoat layer 604. The seed layer 602 is a Si containing material, preferably Si or SiN, which is deposited very thin, (e.g. 1-10 Angstroms). The protective overcoat layer 604 is preferably carbon or diamond like carbon (DLC), which can be deposited to a thickness of 5 to 20 Angstroms. Both the seed layer 602 and the protective overcoat 604 can be deposited by sputter deposition. The thickness of the seed layer 602 and overcoat layer 604 are important to the performance of the magnetic data recording system. The thickness of these layers 602, 604 contributes to the magnetic spacing between the read/write heads and the recording layer of the magnetic medium. Since the strength of the magnetic field (either being written or being read) drops off exponentially with distance, reducing the thickness of these layers 602, 604 greatly improves the performance of the recording system. On the other hand, these layers 602, 604 must be sufficiently thick to protect the slider, magnetic head and media itself from damage, and also to protect the read and write heads from corrosion. If these layers 602, 604 are too thin, there will invariably be places where there is no protection and the reliability of the system will suffer.

The thickness of the layers 602, 604 during deposition can be monitored and controlled by use of an ellipsometer. After deposition, the final thicknesses of the layers 602, 604 can be confirmed by a process such as XRF or Auger measurement. This can be used to very carefully control the thickness of the layers 602, 604. It will be recalled that the refill layer 402 was constructed of a material that does not contain Si or C. This advantageously prevents the refill 402 from being detected during the measurement of the thickness of the layers 602, 604. The inventors have found that, when a material such as SiN is used as the refill layer, this layer is mistakenly detected during the measurement of seed and overcoat layer 602, 604 thicknesses. Therefore, the use of a Si containing material such as SiN leads to inaccurate thicknesses of the layer 602, 604, which as discussed above can lead to decreased performance or compromised reliability.

Therefore, the use of a non-silicon containing non-carbon containing material for the refill layer 402 greatly improves the control of the thickness of the layers 602, 604. In addition, refill materials 402 having a high affinity for oxygen also advantageously improve sensor performance. For example, as those skilled in the art will appreciate, a TMR sensor has a barrier layer that is constructed of an oxide such as MgO, NiO or $Al_2O_3$. A refill layer 402 that is constructed of a material having a high affinity for oxygen helps to preserve the barrier layer for better sensor performance and reliability.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A slider for magnetic data recording, comprising:
   a slider body having a surface with a roughness that includes troughs and peaks;
   a refill material filling at least some of the troughs, the refill material being a material that does not include silicon or carbon;
   a seed layer comprising Si formed over the slider body surface and refill material; and
   a protective overcoat comprising carbon formed over the seed layer.

2. The slider as in claim 1 wherein the refill layer comprises AlOx, TaOx, CrOx, TaN or CrN.

3. The slider as in claim 1 wherein the refill layer comprises a material having a high affinity for oxygen.

4. The slider as in claim 1 wherein the seed layer comprises Si or SiN.

5. The slider as in claim 1 wherein the seed layer comprises Si or SiN and has a thickness of 1-10 Angstroms.

6. The slider as in claim 1 wherein the protective overcoat comprises diamond like carbon.

7. The slider as in claim 1 wherein the protective overcoat has a thickness of 5-20 Angstroms.

8. The slider as in claim 1 further comprising, a read element and a write element formed on the slider body.

9. The slider as in claim 8 wherein the read element is recessed from the surface of the slider body.

10. A magnetic data recording system, comprising:
    a housing;
    a magnetic media mounted within the housing;
    an actuator; and
    a slider connected with the actuator for movement adjacent to a surface of the magnetic media, the slider further comprising:
    a slider body having a surface with a roughness that includes troughs and peaks;
    a refill material filling at least some of the troughs, the refill material being a material that does not include silicon or carbon;
    a seed layer comprising Si formed over the slider body surface and refill material; and
    a protective overcoat comprising carbon formed over the seed layer.

11. The slider as in claim 10 wherein the refill layer comprises AlOx, TaOx, CrOx, TaN or CrN.

12. The slider as in claim 10 wherein the refill layer comprises a material having a high affinity for oxygen.

13. The slider as in claim 10 wherein the seed layer comprises Si or SiN.

14. The slider as in claim 10 wherein the seed layer comprises Si or SiN and has a thickness of 1-10 Angstroms.

15. The slider as in claim 10 wherein the protective overcoat comprises diamond like carbon.

16. The slider as in claim 10 wherein the protective overcoat has a thickness of 1-10 Angstroms.

17. The slider as in claim 10 further comprising, a read element and a write element formed on the slider body.

18. The slider as in claim 17 wherein the read element is recessed from the surface of the slider body.

19. A method for manufacturing a magnetic slider for magnetic data recording, the method comprising:
    forming a slider body having a surface;
    depositing a refill material onto the surface of the slider body, the refill material being a material that does not contain Si or C;
    performing an ion beam etching;
    depositing a seed layer, the seed layer comprising Si; and
    depositing a protective overcoat;
    wherein the ion beam etching is a two step ion beam etching, comprising a first ion beam etching performed at an angle of 70-80 degrees relative to normal, and a second ion beam etching performed at an angle of 55-65 degrees relative to normal.

20. The method as in claim 19 wherein the refill layer comprises AlOx, TaOx, CrOx, TaN or CrN.

21. A method for manufacturing a magnetic slider for magnetic data recording, the method comprising:
    forming a slider body having a surface;
    depositing a refill material onto the surface of the slider body, the refill material being a material that does not contain Si or C;
    performing an ion beam etching;
    depositing a seed layer, the seed layer comprising Si; and
    depositing a protective overcoat; and
    using XRF or Auger measurements during deposition of the seed layer and protective overcoat layer in order to control a thickness of the seed layer and protective overcoat layer.

22. The method as in claim 21 wherein the seed layer is deposited to a thickness of 1-10 Angstroms and the protective overcoat is deposited to a thickness of 5-20 Angstroms.

* * * * *